United States Patent Office

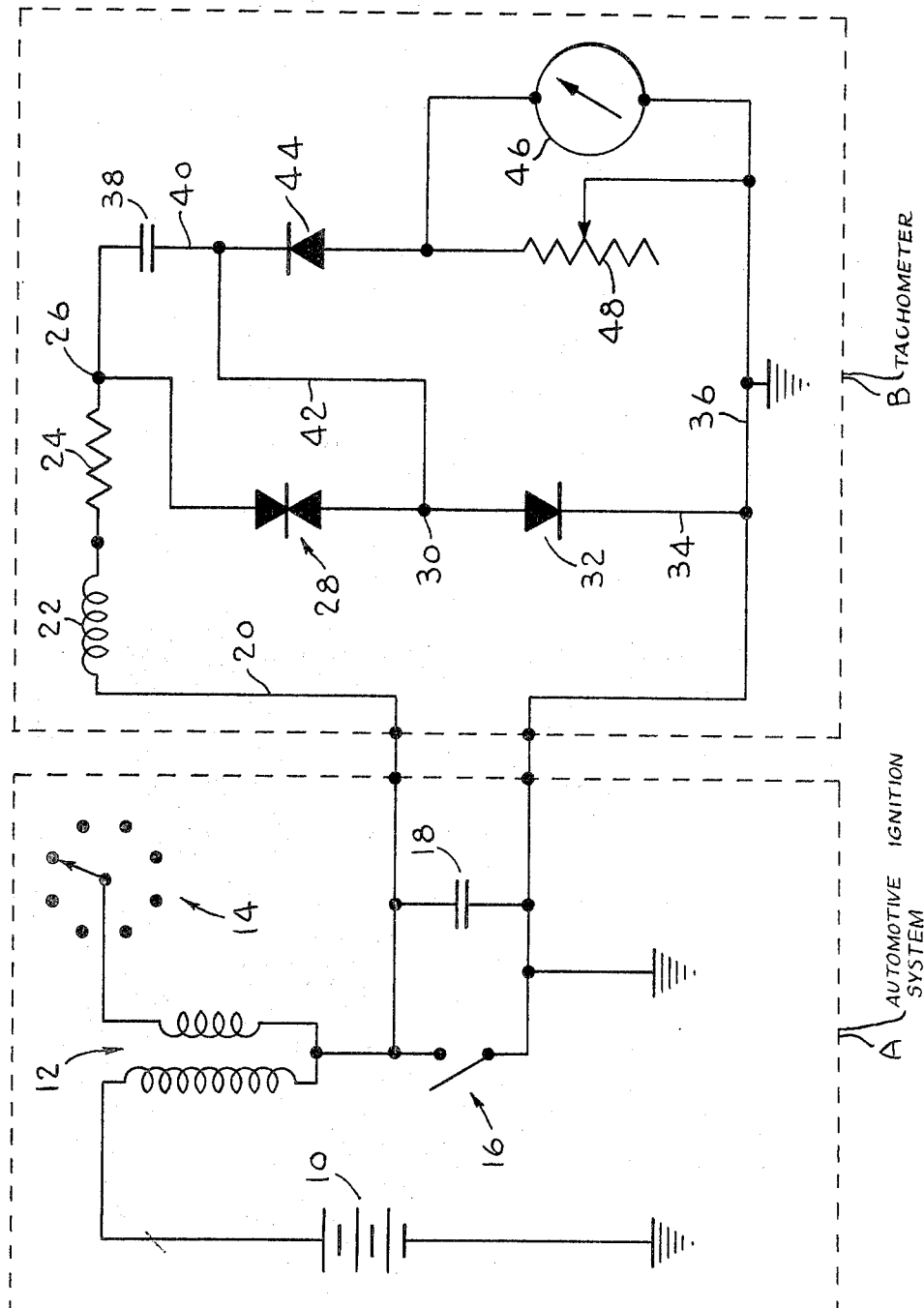

3,283,247
Patented Nov. 1, 1966

3,283,247
VOLTAGE AND TEMPERATURE COMPENSATED TACHOMETER CIRCUIT
Wilbert E. Beller, Park Ridge, Ill., assignor to Controls Company of America, Melrose Park, Ill., a corporation of Delaware
Filed Dec. 31, 1962, Ser. No. 248,624
1 Claim. (Cl. 324—70)

This invention relates to electronic tachometer circuits and has for its principal object the improvement of the performance of such circuits with temperature variations. The invention is applicable to that portion of the generally accepted circuit which receives the signal directly from the automotive ignition system or which receives a signal passed by a transistorized circuit between the present circuit and the ignition system.

At the present time there is a circuit employed in conjunction with virtually all electronic tachometers. This circuit employs a voltage regulating section using a double anode Zener diode to provide a predetermined voltage on one side of a capacitor which is charged when the breaker points of the automobile ignition system are open. While the capacitor is charging there is, of course, some leakage which is passed to ground through a diode which blocks flow back to the capacitor when the charged capacitor is grounded by closure of the points. When the charge on the capacitor is so grounded there will be a current flow through still another diode and this current is measured by an ammeter. Since the breaker points make and break at a speed which is a function of engine speed it will be appreciated that the meter can be calibrated in r.p.m.

The circuit just described in a general sense has become the virtual standard of the industry but is subject to error by reason of the characteristics of the diodes when subjected to temperature change. The forward bias on a diode required to obtain a given current flow goes down with an increase in temperature while the breakdown voltage of a Zener diode increases with an increase in temperature. The amount of this increase in breakdown voltage is greater than the decrease found in the forward bias with the same temperature change. Therefore, a double anode Zener diode which is comprised in a sense of a forward biased and a reverse biased diode in series has a combined effect of increasing the breakdown voltage or regulated voltage with an increase in temperature. This, then, is reflected at one side of the capacitor which is theoretically to be charged with a fixed charge. The other side of this capacitor is connected to ground by a diode biased in the forward direction and, hence, with the same increase in temperature there will be a decrease in the voltage on the grounded side of the capacitor. It will be seen, therefore, that the two effects are additive insofar as the net potential across the capacitor is concerned.

In carrying out the present invention the grounded side of the capacitor is still connected to ground through a diode biased in the forward direction but this diode is now placed in series with the double anode Zener diode and the negative side of the capacitor is connected between the double anode Zener diode and the forward biased diode connecting the negative side of the capacitor to ground. As far as the regulated voltage side of the capacitor is concerned it is now connected to ground through the double anode Zener and the other diode in series and the effect of the repositioning of the latter diode is to temperature compensate the regulated voltage to some extent and thus reduce the error inherent in the circuit with temperature change.

Other objects and advantages will be pointed out in, or be apparent from, the specification and claim, as will obvious modifications of the single embodiment shown in the drawing, in which the portion embraced in the dotted line designated A constitutes the conventional automotive ignition circuit having a battery 10 with the negative grounded and the positive terminal connected to the ignition coil 12, the secondary of which is connected to the distributor 14 and the common of which is connected to the breaker points 16 and the condenser 18. The negative of condenser 18 is connected to ground as conventional. The usual electronic tachometer employs a circuit which is replaced by the circuit embraced in the dotted lines B but there may be a transistorized portion between the automotive ignition system A and the electronic circuit B here under discussion. In any event, the output of the ignition system passes through lead 20 and coil 22 and resistor 24 which serve to smooth out the pulsing and peaking signal coming from the ignition system. At junction 26 there is a connection to the double anode Zener diode 28, the other side of which is connected to junction 30 and then to the diode 32 which, in turn, is connected through lead 34 to grounded bus 36. In the usual circuit the double anode Zener 28 is connected directly to the bus 36. The Zener diode together with coil 22 and resistor 24 constitute a voltage regulating and shaping circuit providing a pulsed D.C. signal at 26 or, in effect, at the positive side of capacitor 38. When the breaker points are open the capacitor will charge to the voltage determined by the characteristics of Zener 28 and this is usually selected to be in the range of 9 to 9.3 volts (for a 12 volt ignition system). During charging of this capacitor there will be some current flow and this is passed to ground through leads 40, 42 and thence through diode 32 which is connected to the grounded bus 36 through lead 34. In the prior standardized circuit the negative of capacitor 38 was connected to the grounded bus 36 through a diode which was not in series with the Zener, as here shown, but was in parallel with the Zener.

When the breaker points 16 close the condenser 38 is, in effect, grounded and this will result in current flow to the negative side of the condenser. This flow is blocked by diode 32 and must pass through diode 44 which is fed through the ammeter 46 having the calibrating potentiometer 48 in parallel. The ammeter dial is scaled to read in r.p.m.

With a temperature increase the net effect on the double anode Zener is to raise the voltage at 26 or on the positive side of capacitor 38. In the prior art arrangement diode 32 was connected from the negative of the capacitor directly to ground in parallel with the Zener with the result that on an increase of temperature the potential on the negative side of the capacitor decreased so that the error on the Zener and the error on the diode were additive. With the present arrangement the diode 32 is connected in series with the Zener so that its inherent decrease with an increase in temperature tends to offset the overall increase of the Zener and thereby reduce the overall elevation of the voltage at point 26. The effect of this simple change can be appreciated when it is realized that with 160° F. change the old circuit changed the output current at the ammeter 46 10.2% whereas with the circuit modified in accordance with this invention the change was 7.0% which is a substantial improvement. This improvement has been effected with no change in parts and no increase in cost, merely involving, as it does, a change in the hook-up of the parts.

Further improvement could be made in the circuit by inserting additional forwardly biased diodes in series with the Zener and diode 32. Of course, this would now entail additional expense which, in an item of this type, might not be attractive. It is obvious that the double anode Zener diode can be replaced by a diode and a separate Zener diode.

I claim:

In a voltage and temperature compensated tachometer circuit comprising an input for receiving a pulsed signal of a frequency which is a function of the speed of a measured device and an output comprising a series connected diode and ammeter, a ground circuit common to said input and said output, a pulse circuit including a capacitor in series with said input and said output, and a shunt circuit including a double base Zener diode between the input side of said capacitor and said ground circuit; the improvement wherein said shunt circuit further includes a diode interposed between said double base Zener diode and said ground circuit, and circuit means connecting the junction between said diode and said double base Zener diode with the ouput side of said capacitor, said output circuit diode and said shunt circuit diode being oppositely poled whereby one of said diodes has its base connected to said capacitor and the other of said diodes has its anode connected to said capacitor.

References Cited by the Examiner

UNITED STATES PATENTS

| 2,983,868 | 4/1961 | Silberbach | 324—70 |
| 3,056,046 | 9/1962 | Morgan | 307—88.5 |
| 3,075,187 | 1/1963 | Richardson et al. | 307—88.5 |
| 3,219,926 | 11/1965 | Dion | 324—70 |

FOREIGN PATENTS

| 843,152 | 8/1960 | Great Britain. |

OTHER REFERENCES

"Knight-Kit Tachometer," Buck Walter, Radio-Electronics, February 1962, pp. 42 and 43.

WALTER L. CARLSON, *Primary Examiner.*

FREDERICK M. STRADER, *Examiner.*

C. W. HOFFMANN, M. J. LYNCH, *Assistant Examiners.*